United States Patent
Ghourchian et al.

(10) Patent No.: US 11,842,613 B2
(45) Date of Patent: *Dec. 12, 2023

(54) SYSTEM AND METHODS FOR SMART INTRUSION DETECTION USING WIRELESS SIGNALS AND ARTIFICIAL INTELLIGENCE

(71) Applicant: AERIAL TECHNOLOGIES INC., Montréal (CA)

(72) Inventors: Negar Ghourchian, Montréal (CA); Michel Allegue Martinez, Montréal (CA)

(73) Assignee: Aerial Technologies Inc., Montreal (CA)

( * ) Notice: Subject to any disclaimer, the term of this patent is extended or adjusted under 35 U.S.C. 154(b) by 210 days.

This patent is subject to a terminal disclaimer.

(21) Appl. No.: 17/347,754

(22) Filed: Jun. 15, 2021

(65) Prior Publication Data

US 2021/0312777 A1    Oct. 7, 2021

Related U.S. Application Data

(63) Continuation of application No. 16/303,301, filed as application No. PCT/CA2017/000136 on May 31, 2017, now Pat. No. 11,043,094.

(Continued)

(51) Int. Cl.
*G08B 13/24* (2006.01)
*G08B 25/08* (2006.01)
(Continued)

(52) U.S. Cl.
CPC .......... *G08B 13/2491* (2013.01); *B60R 25/31* (2013.01); *G08B 25/08* (2013.01); *G08B 25/008* (2013.01)

(58) Field of Classification Search
CPC .. G08B 13/2491; G08B 25/08; G08B 25/008; B60R 25/31
See application file for complete search history.

(56) References Cited

U.S. PATENT DOCUMENTS 8,138,918 B2    3/2012   Habib et al.
8,818,288 B2    8/2014   Patwari et al.
(Continued)

OTHER PUBLICATIONS

Wei et al. Radio-based Device-free Activity Recognition with Radio Frequency Interference, IPSN '15 Proceedings of the 14th international conference on information processing in sensor networks, Apr. 14-16, 2015, p. 154-165, 12 pages (Year: 2015).

(Continued)

*Primary Examiner* — Nay Tun
(74) *Attorney, Agent, or Firm* — Rosenberg, Klein & Lee

(57) ABSTRACT

An intelligent entrance detection system is provided where, primarily, any authorized or unauthorized entry to an area of a residential (or small industrial) unit covered by a wireless network is automatically detected from active off-the-shelf devices in that area. After the detection, an identification algorithm is employed to verify if this entry is a legal or illegal action. Based on this verification, either the routine smart home system is activated or a hazardous monitoring period begins to further investigate the suspicious event. If the illegal entrance is confirmed during the hazardous monitoring period, the owner of the property is informed through an intruder alarm protocol. In this invention, all of the analytic and processing steps, including entrance detection, owner identification, and device-free authority verification are designed based on monitoring and quantification of changes in surrounding wireless signals originated by human or object movements within the sensing area.

10 Claims, 6 Drawing Sheets

Related U.S. Application Data

(60) Provisional application No. 62/347,217, filed on Jun. 8, 2016.

(51) Int. Cl.
    *B60R 25/31*     (2013.01)
    *G08B 25/00*     (2006.01)

(56) References Cited

U.S. PATENT DOCUMENTS

| | | |
|---|---|---|
| 8,836,344 B2 | 9/2014 | Habib et al. |
| 9,143,968 B1 | 9/2015 | Manku et al. |
| 9,208,676 B2 | 12/2015 | Fadell et al. |
| 9,520,041 B2 | 12/2016 | Rosa et al. |
| 10,008,107 B2 | 6/2018 | Li |
| 2004/0021599 A1 | 6/2004 | Hall et al. |
| 2005/0227707 A1 | 10/2005 | Law et al. |
| 2010/0130229 A1 | 5/2010 | Sridhara et al. |
| 2011/0273321 A1 | 11/2011 | Joshi et al. |
| 2012/0146788 A1 | 6/2012 | Wilson et al. |
| 2012/0164978 A1 | 6/2012 | Conti et al. |
| 2013/0346014 A1 | 12/2013 | Nadkarni et al. |
| 2014/0004874 A1 | 1/2014 | Schwartz et al. |
| 2015/0005030 A1 | 1/2015 | Pennanen et al. |
| 2015/0062343 A1* | 3/2015 | Hwang ............ G08B 13/19647 348/148 |
| 2015/0324412 A1 | 11/2015 | Pennanen et al. |
| 2016/0178741 A1 | 6/2016 | Ludlow et al. |
| 2016/0183095 A1 | 6/2016 | Nagy et al. |
| 2016/0309834 A1 | 10/2016 | Zwick et al. |
| 2017/0244897 A1 | 8/2017 | Coote |
| 2017/0309146 A1 | 10/2017 | MacKenzie et al. |
| 2018/0106897 A1 | 4/2018 | Shouldice et al. |
| 2018/0294904 A1 | 10/2018 | Martinez et al. |

OTHER PUBLICATIONS

Chakkor et al.: "Efficiency Evaluation Metrics for Wireless Intelligent Sensor Applications", International Journal of Intelligent Systems and Application, vol. 6, No. 10, Jul. 6, 2014 (Jul. 6, 2014), pp. 1-10, XP055443126, Retrieved from the Internet <URL:http://scholar.google.ca/scholar?hl=en&as_sdt=0%2C5&q=Efficiency+Evaluation+Metrics+for+Wireless+Intelligent+Sensor+Applications&btnG=>.

* cited by examiner

SYSTEM AND METHODS FOR SMART INTRUSION DETECTION USING WIRELESS SIGNALS AND ARTIFICIAL INTELLIGENCE

CROSS-REFERENCE TO RELATED APPLICATIONS

This patent application claims the benefit of priority as a continuation patent application of U.S. Ser. No. 16/303,301 filed Nov. 20, 2018, which itself claims the benefit of priority as a 371 National Phase Application of PCT/CA2017/000,136 filed May 31, 2017, which itself claims priority from U.S. Provisional Patent Application 62/347,217 filed Jun. 8, 2016, the entire contents of each being herein incorporated by reference.

FIELD OF THE INVENTION

This invention relates to security systems and more particularly to system and methods for intelligent security infrastructure and intruder alarm for residential or small industrial areas.

BACKGROUND OF THE INVENTION

Long-term automated monitoring of properties, e.g. residential and commercial properties, is an interesting topic in the context of security and surveillance applications. The first step toward designing an automatic security system for a unit is to detect any entrance to the area's gateways, which is usually captured by a sensing device-oriented infrastructure installed in the environment. This step is often followed by an identification phase, which verifies whether or not this entry is an authorized presence.

Most of the current intrusion detection approaches include heavy deployment of complex sensing infrastructures, including vision-based (e.g., cameras) and environmental motion-based (e.g., light, proximity and heat sensors) systems, which continuously observe changes relating to or arising from the surrounding environment and detect abnormal events and activities. However, the existing sensor-based approaches burden excessive deployment and heavy device/labor expenses to their users and demand constant maintenance and control services. On the other hand, vision-based sensing infrastructures raise serious privacy concerns when it comes to constantly monitoring people's personal and professional lives. In addition to being intrusive, video streams and images are very high dimensional signals and their long-term processing and analyzing techniques are relatively infeasible, complex, and computationally expensive. Another issue of vision-based technologies is their sensitivity to illumination variations, occlusions, and background changes, all of which make them impractical in home security applications.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to security systems and more particularly to system and methods for intelligent security infrastructure and intruder alarm for residential or small industrial areas.

In accordance with an embodiment of the invention there is provided a method of system comprising a plurality of wireless-enabled devices associated with a predetermined region of a property operating according to a common wireless standard, wherein metrics extracted from the wireless signals transmitted and received by the plurality of wireless devices provide an intelligent security system.

In accordance with an embodiment of the invention there is provided a method comprising employing metrics extracted from wireless signals transmitted and received by a plurality of wireless devices to provide an intelligent security system, the plurality of wireless devices associated with a predetermined region of a property and operating according to a common wireless standard.

In accordance with an embodiment of the invention there is provided a system comprising a plurality of wireless devices associated with a predetermined region of a property operating according to a common wireless standard, wherein metrics extracted from the wireless signals transmitted and received by the plurality of wireless devices provide an intelligent security system, and a pre-processing block to perform signals conditioning upon received wireless signals comprising a bank of digital filters according to a predetermined architecture for providing multiple signal paths of filtered signal to a plurality of detection blocks, the filtered signal for each detection block depending upon an activity the detection block is intended to classify.

In accordance with an embodiment of the invention there is provided a method comprising establishing a presence of a user within an entrance to an area by analyzing the signal dynamics and signal statistics of wireless signals within the entrance to the area.

In accordance with an embodiment of the invention there is provided a method comprising analyzing the signal dynamics and signal statistics of wireless signals within an area, both real time and long term, in order to establish at least of user entrance into an empty area, anomaly detection, user identification, user presence and movement detection, user location estimation, user activity recognition and a determination whether an entry made by a user into the area is a legal or an illegal action.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
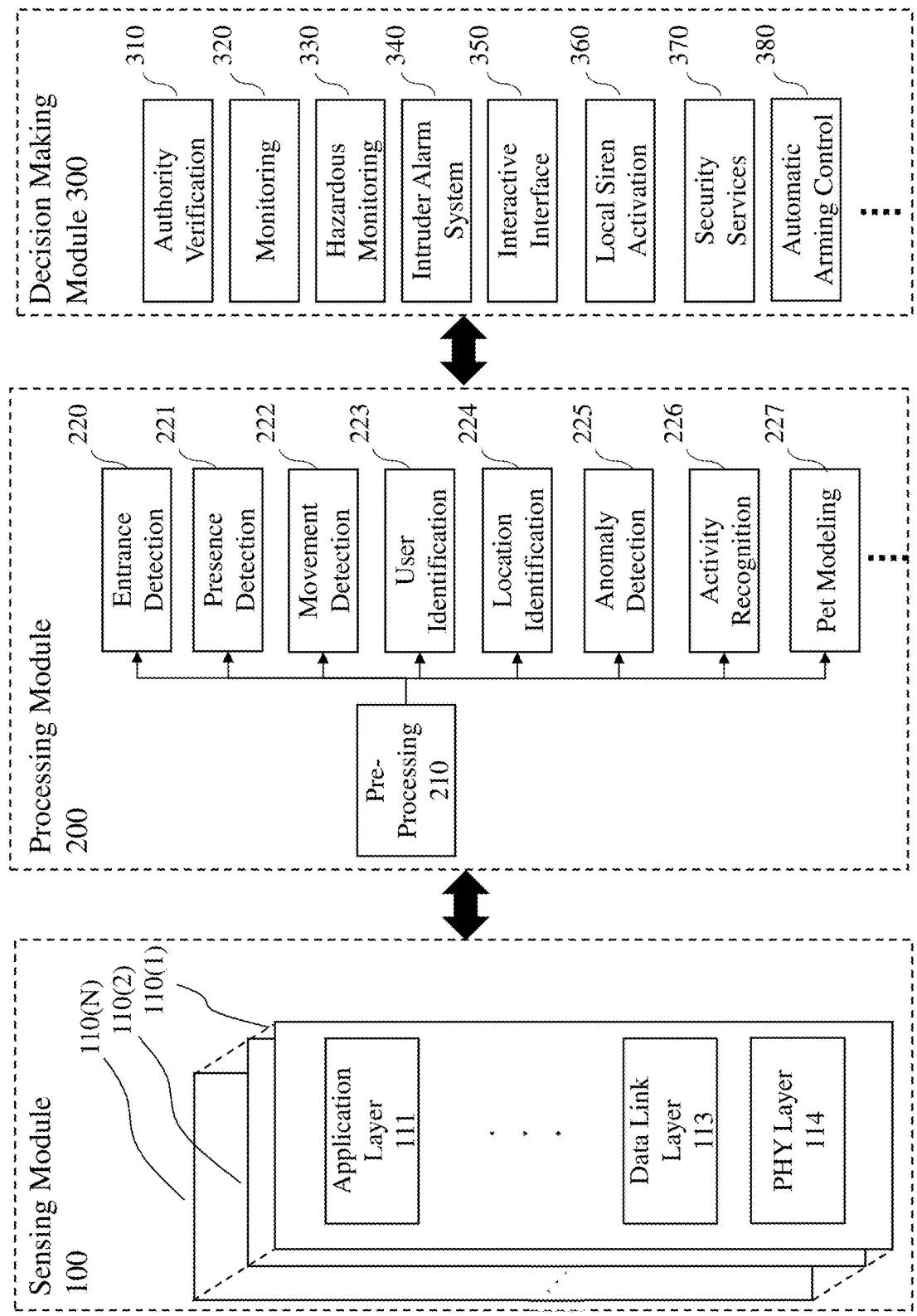
FIG. 1 depicts an exemplary overview of a proposed intelligent security system according to an embodiment of the invention.

The present invention is directed to security systems and more particularly to system and methods for intelligent security infrastructure and intruder alarm for residential or small industrial areas.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, mechanical systems, robotic systems, android systems, animals, etc. that may be characterised by an ability to enter and/or exit a sensed area.

A "property" as used herein may refer to, but is not limited to, what is known variously within law as real property, real estate, realty, or immovable property which is any subset of land that has been legally defined. Accordingly, this includes but is not limited to, personal property such as a residential unit, house, apartment, condominium, etc.; commercial property such as retail locations, manufacturing locations, shopping malls, office buildings, offices etc.; and Government/utility property as owned and/or managed by one or more levels of a Government at local, state, federal level or utilities such as water, electric, gas, etc. and may include but not be limited to Government buildings, Government offices, infrastructure buildings, wells, dams, ponds, mines, canals, and roads, etc. Property may also refer to, but is not limited to, undeveloped property, property without construction such as farmland, garden, parks etc. Property may also refer to, but not be limited to, non-permanent structures and/or locations such as personal tents, commercial/corporate tents, etc. Property may also include internal spaces defined by a vehicle, e.g. caravan, trailer, recreational vehicles, buses, etc.

A "wireless signal" (also referred to as a radio wave) as used herein refers to a signal transmitted from a wireless transmitter and received by a wireless receiver wherein the wireless transmitter and wireless receiver operate according to a standard or protocol. Such standards may include, but are not limited to, IEEE 802.11. IEEE 80215. IEEE 802.16 IEEE 802.20. UMTS. GSM 850. GSM 900. GSM 1800. GSM 19011 GPM ITU-R 5.13& ITU-R 5.150. ITU-R 5.280, and IMT-2000. However, wireless transmitters and receivers may operate in non-telecommunication or Industrial, Scientific and Medical (ISM) spectral regions without departing from the scope of the invention.

An "owner" as used herein refers to, but is not limited to, an individual or individuals associated with a property, e.g. the owner of a residential housing unit, the owner of an office building, the renter of a retail space. An owner may include, therefore, but is not limited to an individual or individuals legally registered as having title to a property, an individual or individuals having an agreement with the legal registered title owner of a property, an individual or individuals given rights with respect to a property (e.g. a head of security for an office building, a director of an enterprise associated with a property, etc.).

The long-term automated monitoring of properties is one aspect within the wider context of security and surveillance applications. Within the prior art a core element within any automatic security system is the installation of sensing-device orientated infrastructure to detect ingress through entrances or gateways with respect to the property or properties. This step is often followed by an identification phase, which verifies whether or not this entry is an authorized presence. Prior art intrusion detection approaches include heavy deployment of complex sensing infrastructures, such as those based upon vision, motion, proximity, thermal, proximity etc. which continuously observe changes relating to or arising from the surrounding environment and detect abnormal events and activities. However, as discussed supra these existing sensor-based approaches require installation with associated device and labor expenses initially and subsequent ongoing maintenance and control services. Such systems are also generally incompatible with temporary security requirements either within permanent structures or temporary structures and/or locations. These requirements are further complicated in public locations etc. by concerns over privacy in respect of constantly monitoring people's personal and professional lives.

Additionally, automating some security methods such as image signal processing are infeasible, complex, and/or computationally expensive even without consideration of sensitive to illumination, occlusions, background etc. which tend to be more significant within residential applications than commercial applications.

Accordingly, embodiments of the invention address the detection of ingress within residential, commercial, retail, and other environments either without any dedicated security device requirements or through the deployment of wireless infrastructure that does not require significant labor, expense, modification of the property. Further, embodiments of the invention are suitable for use in temporary locations/properties etc. Accordingly, the inventors exploit wireless connections, either already present within the property or established, through monitoring and analyzing changes in the characteristics of the wireless signals. More precisely, the inventor's system exploits wireless communication signals from portable electronic devices, fixed electronic devices, base stations, wireless routers, etc. belonging to an area, namely the sensing area, and extracts statistics from coarse-grained to fine-grained information of at least the physical layer and/or the data link layer (adopting the Open Systems Interconnection (OSI) reference model) of such communication systems, for example, Media Access Control (MAC) address measurements that reveal the frequency response of the channel (e.g., Channel State Information (CSI)) and/or Received Signal Strength Indicator (RSSI). Then, using these measurements that are sensitive to environmental variations and events, any disturbance in the environment caused by human or vehicle entrance into the covered sensing area is detected. Subsequently, a monitoring period begins, wherein the identification of the person is verified through their physical movement and gestures, such as walking patterns, using the analysis of wireless signal measurements.

At the same time, these measurements are processed through an anomaly detection algorithm where any meaningful unusual activity such as an entrance from an unexpected location like a window or emergency stairs, running at the entrance, and falling objects, all of which can indicate a potential intrusion. In the occasion that the analytic results from the monitoring period confirm the intrusion to the residential area, a hazardous monitoring will be triggered and the owner of the property is instantly alerted via the user interface. If the identity of the person is recognized as an authorized person and no unusual event is detected, the monitoring period terminates and the routine smart activity recognition is activated. At this point, the intrusion detections system is disarmed automatically and the measurements are primarily used by activity recognition and location detection algorithms to assist in intelligent home automation such as lighting or heating controls. Moreover, any further entrance to the sensing area is directly reported through the user interface.

It is evident that the analysis methods, according to embodiments of the invention, are very general. Essentially, any information gleaned from off-the-shelf existing wireless devices can be analyzed as input data to monitor the entrance and presence of people into a space covered by a wireless network. Accordingly, whilst it is envisioned that embodiments of the invention will employ fixed electronic devices, base stations, wireless routers, and other "pseudo-permanent" wireless devices within a property it is equally feasible for embodiments of the invention to exploit mobile electronic devices and other "pseudo-non-permanent" wireless devices. As evident from embodiments of the invention the system exploits one or more transmitter-receiver pairs although there is no requirement per se for the transmitter to be within the sensed area. It would also be evident that the area being sensed may be established, for example, by selection of the wireless standard such that for example Bluetooth Class 1 devices support sensed areas of order a few meter radius (10 feet) whilst Bluetooth Class 2 devices support sensed areas of order of 10 meters (33 feet) radius depending upon location, property geometry, property materials etc. In other embodiments of the invention dedicated wireless transmitter-receiver devices may be employed in wireless bands outside those normally employed, e.g. the wireless security system operates in the Industrial, Scientific and Medical (ISM) bands, wherein wireless power, single versus multi-antenna designs etc. may support configuration to the property area being sensed through defining range, beam forming, etc.

It would be evident to one of skill in the art that embodiments of the invention are described below and depicted in FIGS. 1 to 6 respectively with respect to a system that provides an intelligent intruder detection framework. However, whilst the embodiments of the invention exploit wireless devices an embodiment of the invention may be a software application in execution upon the wireless devices with local analysis and decision making or the wireless devices may be linked via a communications network to a remote server or servers such that the software application comprises a first portion on the wireless devices establishing the measurements and a second portion on the remote server(s) performing the analysis, notifications, alarm determination, etc.

Accordingly, embodiments of the invention are described below and depicted in FIGS. 1 to 6 respectively with respect to a system that provides an intelligent intruder detection framework in the context of smart home security. It would be evident that the embodiments of the application may be employed in other security and/or monitoring applications without departing from the scope of the invention.

Within embodiments of the invention described below and depicted in FIGS. 1 to 6 respectively a key idea is to monitor the influence of human body movements and gestures on the changes in strength and pattern of wireless communications in order to capture the physical presence and location of people within a sensing area. This design methodology is motivated by two facts; first, that wireless signals between a wireless transmitter and a wireless receiver are pervasive in our daily life at home, work and even public places today; and second, that physical movements, activities and displacements of humans and/or any moving objects (e.g., pet, vehicle and domestic robots) have a significant impact on the characteristics of the surrounding wireless signals. Owing to recent wireless technology improvements, this disturbance caused by the moving object can be quantified by collecting certain measurements from existing off-the-shelf devices (e.g., laptop computers, smart TVs, wireless routers, and wireless access points) within the wireless sensing area. Therefore, the inventor's proposed framework does not depend on any excessive sensing modality and can solely sense the environmental variations from existing wireless device deployments within permanent properties and/or locations in some embodiments of the invention or from temporary wireless deployments in temporary properties and/or locations within other embodiments of the invention.

These collected measurements have great potential to reveal detailed information about the source(s) of the movements and displacements in the active sensing environment. Particularly, the inventors are interested in inferring correlations between the variation of the wireless signals and actual activities and events that have caused the disturbance in the measurements.

A general exemplary system overview of a proposed intelligent security system according to an embodiment of the invention is depicted in FIG. 1. The proposed system includes a Sensing Module 100 that exploits, records and transmits a wide range of information from all of the active wireless devices within a location depicted as devices 110(1) to 110(N) respectively. The information includes but is not limited to Physical Layer (PHY layer) 114 information such as CSI and RSSI measurements for example, Data Link Layer 113 information such as MAC addresses for example, and user interface Application Layer 111 data. These measurements are transferred to a Processing Module 200 where the raw data is processed and analyzed using a variety of signal processing, statistical analysis and data mining tools in order to characterize events provoked by static or moving objects by creating representative statistical models.

The Processing Module 200 consists of a task-independent shared unit, Pre-Processing Unit 210, followed by a series of specialized units with task-specific properties including, but not limited to:
Entrance Detection 220;
Presence Detection 221;
Movement Detection 222;
User Identification 223;
Localization or Location Identification 224;
Anomaly Detection 225;
Activity Recognition 226; and/or
Pet Modeling 227

The output of these analytic units, individually or jointly, influence the strategic decisions made by the intelligent security system. These units are interactively connected to a Decision Making Module 300, where outputs from the Processing Module 200 is concluded. Within this Decision Making Module 300, semantic and logical strategies are made based on ongoing events to protect the security of the sensing area. These strategies are selected from a predetermined set of actions including inquiries from specialized processing units and the activation of other electronic devices, equipment etc. As depicted these specialized processing units include, but are not limited to:
Authority Verification 310;
Monitoring 320;
Hazardous Monitoring 330;
Intruder Alarm 340;
Interactive Interface 350;
Local Siren Activation 360;
Security Services 370; and
Automatic Arming Control 380.

Within the following description with respect to an exemplary embodiment of the invention the inventors present descriptions of these different modules and units, as well as the way in which they function and interact with each other.

Figure 2:
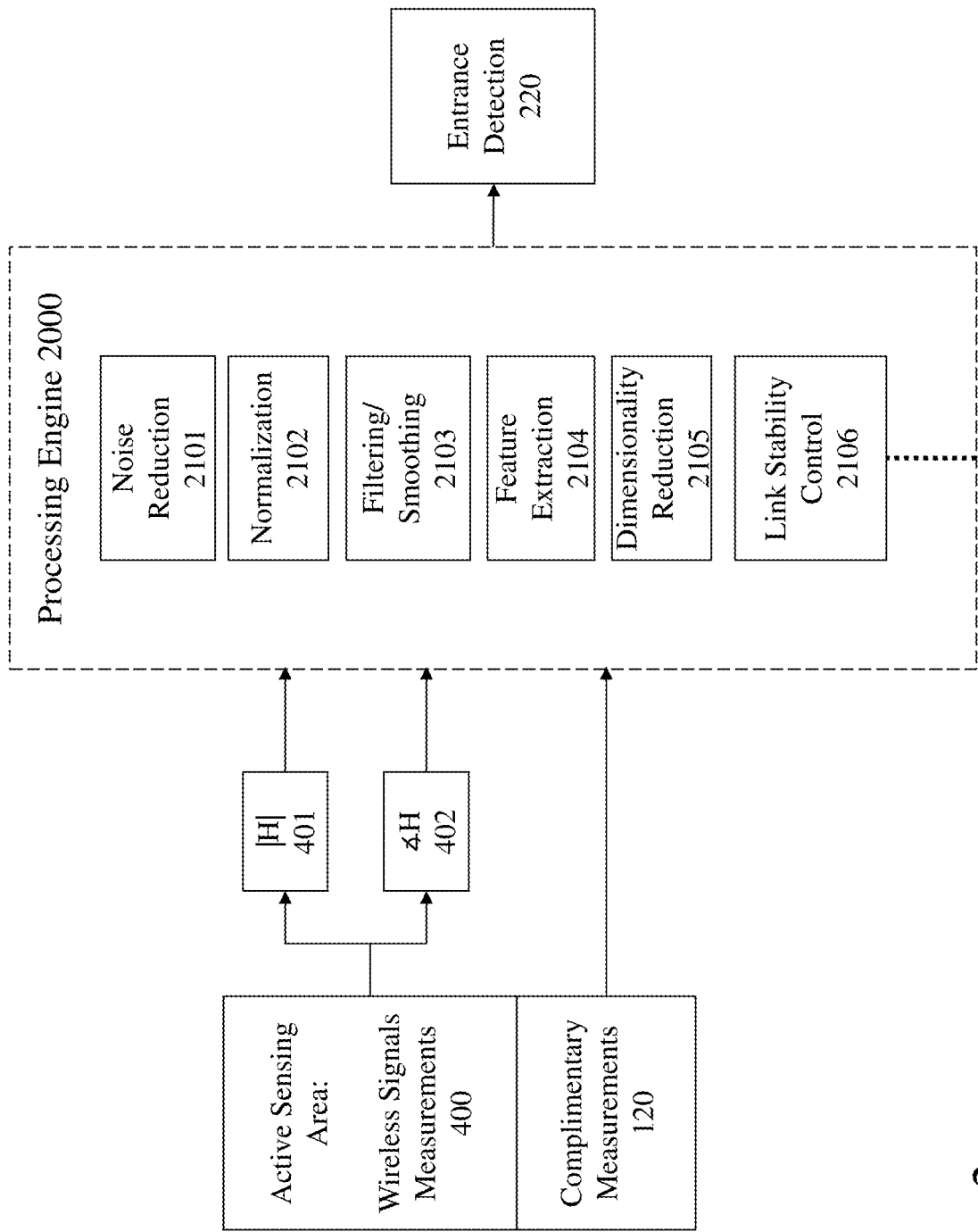
FIG. 2 depicts an exemplary architecture of a Processing Engine for an intrusion detection system according to an embodiment of the invention.

The primary step of the system is to recognize any entrance event in the active sensing area, which can be categorized into two types in terms of the initial state of the area: entrance into the empty sensing area, which is considered as first-entrance, and entrance into the pre-occupied sensing area, which is referred to as next-entrance. In either case, the event of entrance is detected based on the measurements collected from Sensing Module 100 and analyzed through a Processing Module 200 at an Entrance Detection unit 220. An exemplary architecture 2000 of a system for processing raw data for detecting an entrance to an active empty area is depicted in FIG. 2 which is described below. Moreover, the initial state of the area is determined using the same set of measurements but is verified in the Presence Detection unit 221 wherein the Automatic Arming Control unit 380 controls whether an intruder detection unit should be armed or disarmed at each time. The next-entrance into the occupied area may be directly reported to the owner/owners of the property through the Interactive Interface 350 based on the assumption that at least one of the owners are already present at that particular moment. However, a first-entrance into the empty sensing area will activate a period of Monitoring 320, wherein the authority of the person is verified. Alternatively, when the Presence Detection unit 221 confirms that no one is within the sensing area for a predetermined period of time, the Automatic Arming Control unit 380 unit the intrusion detection system.

Figure 3:
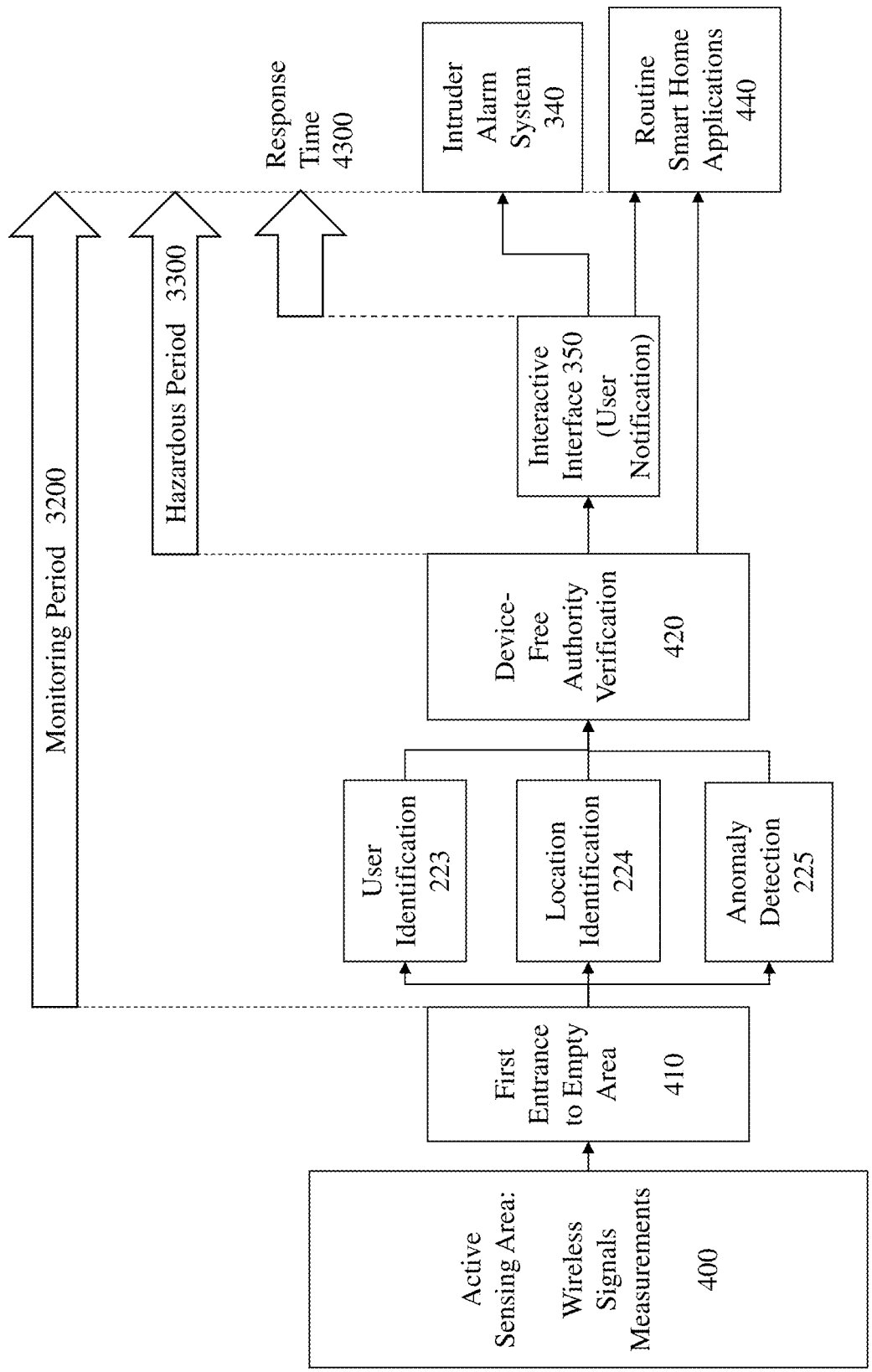
FIG. 3 depicts an exemplary architecture of the system for processing the first entrance to an empty sensing area according to an embodiment of the invention.

When the sensing area is empty for a predetermined period of time, the security system gets automatically armed, which means the Entrance Detection unit 220 is activated. The predetermined period of time may be defined by the system as a default, may be defined by the system based upon previous verification activities, or set by a user. The first-entrance into a sensing area can occur by a user and/or a vehicle according to the sensing area. An exemplary architecture 3000 of a system for processing the first entrance to an empty sensing area according to an embodiment of the invention is depicted in FIG. 3. As mentioned supra, this event will lead to activation of the Monitoring 320, which engages several units from Processing Module 200. The first is the User Identification unit 223, which incorporates signal measurements to identify a human subject through the analysis of the way they walk and their body shape. Once a human subject steps into an Active Sensing Area 400, their specific gait characteristics and walking style will start changing the wireless signals. These changes are collected and preprocessed, and then fed into pre-defined user profiles of the owners to verify the identity of the person. If the entry occurs through a vehicle, the user identification unit is enabled to detect the passenger's identity through gait recognition as soon as they exit the vehicle and start walking.

The other processing unit that is activated once a new entry occurs into an empty sensing area is the Anomaly Detection unit 225. This unit constantly evaluates the detected events during the period the Monitoring unit 320 is active, depicted as Monitoring Period 3200, to identify/isolate any unfamiliar or odd event. These types of events include, but are not limited to, Falling objects;
Unusual walking speed or running at entrances;
Very fast performance of routine activities such as rapid walking up-stairs and downstairs
Suspicious (not very often used) entry points,
Entering and exiting multiple rooms, and/or
Entrance from unusual gateways such as windows or emergency exits.

One important indication of the presence of an intruder could be the fast and unusual speed of walking at entrances or other locations, such as stairs. As part of anomaly detection process, the frequency information of the wireless signals is used to detect the speed of activities, for example, running. A set of digital filters targeting specific frequency bands collecting information about different activities is considered as part of the methods described herein.

Another important processing unit that is engaged during the monitoring period is the Location Identification unit 224. This unit infers the location of humans or the moving objects from the variation of signal measurements, and starts tracking the subjects from the moment of their entry. Besides the Anomaly Detection unit 225, many other parts of the system utilize location information, such as the Decision Making module 300 and the Activity Recognition unit 226.

At the end of Monitoring Period 3200, all of the engaged units transfer their analytic evaluations to the Decision Making Module 300. If any of these assessments indicate that the presence of the subject in the sensing area is not authorized, the security system launches into a period referred to as the Hazardous Period 3300. Within an exemplary scenario, wherein the Decision Making Module 300 has concluded an illegal entry, an Intruder Alarm 340 system initiates, wherein the owner/owners will be informed via the Interactive Interface 350. In this case, the Monitoring Period 3200 and Hazardous Period 3300 will be extended until the owners respond to the alarm. Since the Response Time 4300 can vary from user to user and instance to instance then it may be manually set by the owners' preferences. After the user-specified waiting time is over, or if the intrusion is confirmed by the owners, a Local Siren 360 may be activated and/or Security Services 370 notified.

If, during the Monitoring Period 3200, no anomaly is detected or the identity of the entered subject is identified as safe or legal entry, the Monitoring Period 3200 will be over. In this incident, the signal measurements collected at the Sensing Module 100 will be utilized by Routine Smart Home Applications 440 and their corresponding Processing Modules 200 such as Activity Recognition 226, Location Identification 224 and Pet Modeling 227. For example, depending on the location of the subject in a residential area, the heating or cooling system may start functioning, or the lights can be turned on/off etc.

Figure 4:
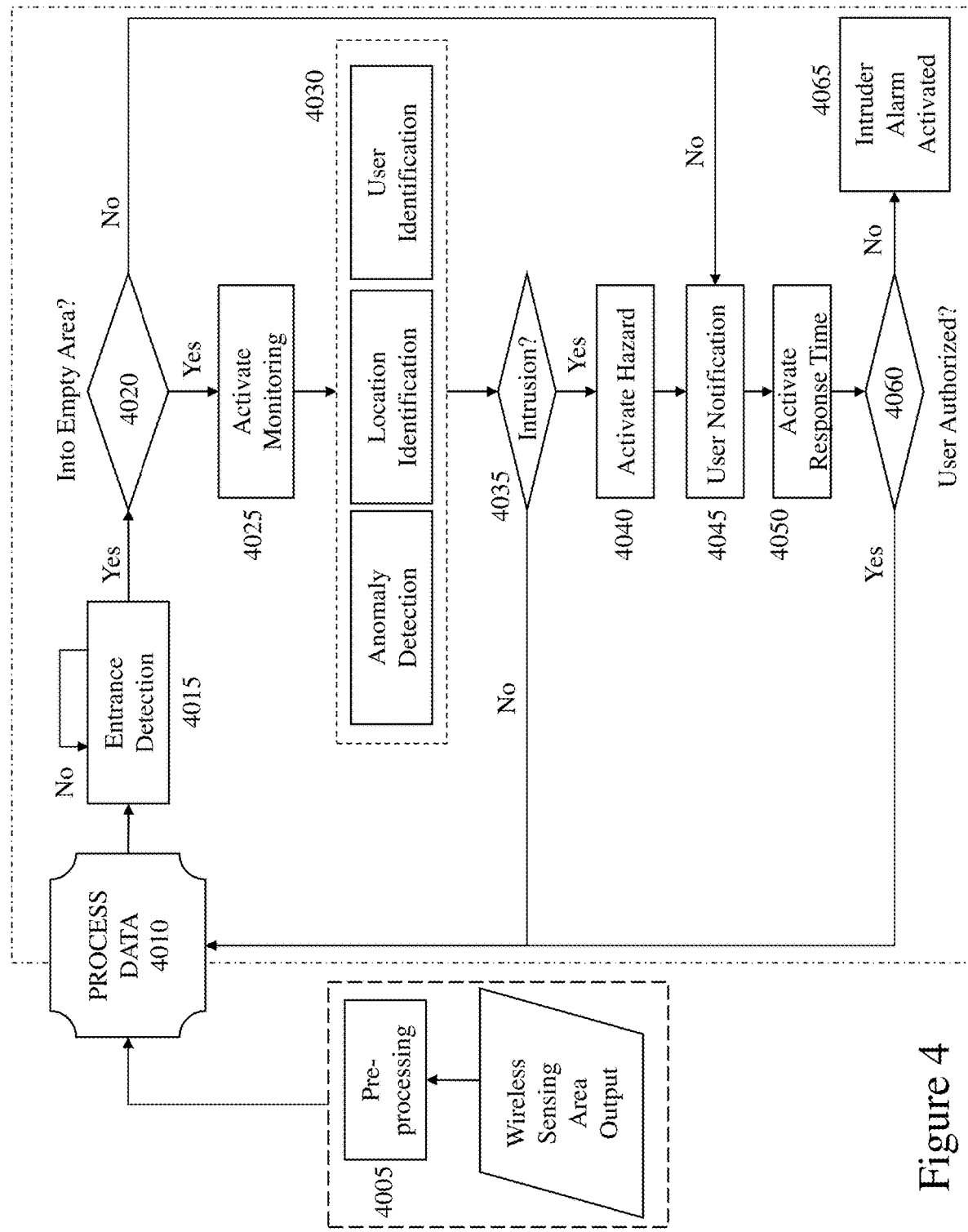
FIG. 4 depicts an exemplary flow chart of the security system implementable within a logic unit running upon a local or remote computing system according to an embodiment of the invention.

Now referring to FIG. 4 there is depicted an exemplary flow chart of the security system implementable within a logic unit running upon a local or remote computing system according to an embodiment of the invention as active within an Active Sensing Area 400. Accordingly, at step 4005 the process accumulates wireless sensing area output data which is continuously or intermittently pre-processed and presented to Process Data 4010 comprising steps 4015 to 4065. Accordingly, in step 4015 a determination is made as to whether an entrance event has been detected wherein the process loops pending such an event otherwise upon a determination it proceeds to step 4020 wherein a determination is made as to whether the area within which the entry is detected is currently an empty area of not. If, it is empty then process proceeds to step 4025 otherwise it proceeds to step 4045. In step 4025 the process activates monitoring processes, which may include, but not be limited to, those as depicted in process step 4030 comprising Anomaly Detection, Location Identification and User Identification. In step 4035 the process determines whether an intrusion has occurred and accordingly either returns to Process Data 4010 if no intrusion is determined or proceeds to step 4040 and activates the hazard process/hazard monitoring wherein it proceeds to step 4045 with user notification. From step 4045 the process proceeds to step 4050 and activates the response timing process/monitoring and subsequently in step 4050 determines whether an authorized user is present or has responded. If so, the process proceeds back to Process Data 4010 otherwise it proceeds to step 4060 and an Intruder Alarm is activated. It would be evident that the alarm may be cancelled by the user and/or remote monitoring station, police, emergency services, security personnel etc. according to the property once the alarm has been triggered either in response to the property being visited or through receipt of an incorrect triggering by an authorized user as known in the prior art.

Now that the inventors have outlined the main blocks and their role in the system, further details regarding each specific module can be covered, providing some implementation examples. Accordingly, the inventors consider initially the sensing infrastructure, which includes one or multiple Sensing Modules 100 and their associated devices 110(1) to 110(N) respectively. Additionally, each Sensing Module 100 may contain different OSI layers, such as physical layers and Data Link Layers.

Sensing Module 100: An active sensing area can be created through at least one sensing infrastructure, such as devices 110(1) to 110(N) respectively where N≥1, each consisting of a pair of wireless devices, a wireless transmitter, and a wireless receiver. In wireless communications, radio (wireless) signals propagate between the transmitter and receiver through several transmission channels. The channel properties of a communication link can be mathematically modeled by the transmitted and received signals, as well as any disturbance effect of every object in the environment, such as reflections, diffraction, and scattering effects. In fact, the received signal is a result of the interference of several multipath signals transmitted through the surrounding objects and all other disturbances events. Therefore, the characteristics of these communication channels are highly correlated to environmental variations.

This motivates a quantitative study of signal propagation behavior within an active sensing area to measure and evaluate different types of disturbances within the environment. The major challenge here is to statistically formulate the correlation between the environmental events and the communication channel properties. One example of the collected measurement regarding channel properties, which forms a basis of some embodiments of the invention, are the Channel State Information (CSI) values.

In the frequency domain, consider a narrow-band and flat-fading channel with multiple potential streams between transmitter and receiver antennas, which can be modeled as defined in Equation (1), where x, y, n, and H denote the transmitted vector, received vector, noise and the channel matrix for all links, respectively.

$$y_{(s,l)} = x_{(s,l)} H_{(s,l)} + n_{(s,l)} \tag{1}$$

The CSI values are the estimated values of complex matrix H(t), which is the channel response and/or the transformation of subcarrier s∈ {1, 2, . . . , S} in stream l∈ {1, 2, . . . , L} at time t. Considering complex values of matrix H(t), let |H(t)| and ∠H(t) denote magnitude and phase responses, respectively. Accordingly, at each time-stamp, a pilot signal x(t) is transmitted from transmitter through L streams on S subcarriers in the frequency domain, and the signal y(t) is received at the receiver.

All sources of wireless measurements collected from the sensing area, e.g. CSI measurements, are constantly transformed from the Sensing Module 100 to the Processing Module 200 where, depending on the data type, multiple signal processing and data mining procedures are applied to the data streams. As mentioned supra, this Processing Module 200 within some embodiments of the invention begins with a shared step, namely the Pre-Processing unit 210, which is followed by a series of specialized units, such as User Identification 223 and Entrance Detection 220 for example.

Processing Module 200: Comprising Pre-Processing unit 210 and one or more processing units.

Pre-Processing 210: The purpose of this unit is twofold: to enhance the raw data for further analysis, and to extract and/or generate discriminative features that precisely reflect variations within the sensing environment. FIG. 2 depicts an exemplary architecture 2000 of a system comprising a Processing Engine 2100, including examples of pre-processing steps, that receives raw wireless measurements discretely or in combination with Complimentary Measurements 120 and produces data within appropriate proper data format(s) for Entrance Detection unit 220. According to the type of collected measurements, standard signal processing techniques, including but not limited to, Noise Reduction 2101, Normalization 2102, and Filtering and/or Smoothing 2103 are applied for the enhancement of the raw Wireless Signals Measurements 400, including both CSI and non-CSI Complementary Measurements 120. Subsequently, depending on the data type enhanced signals or complementary measurements pass through a Feature Extraction unit 2104, Dimensionality Reduction unit 2105 and/or Link Stability Control 2106, where different informative values are derived from the signals.

Assuming that the dynamics of these measurements are distinguishable when different events occur in the environment, extraction of relevant feature values facilitates the discrimination between different events. Depending on the task, there are a number of techniques for extracting efficient information from wireless signals. As a working example, a set of feature extraction strategies is provided for inferring meaningful information from wireless measurements, and we will describe where each feature set will be utilized in the subsequent sections.

Consider the example measurements (the CSI values) introduced supra, as raw wireless signals that are pre-processed and feed into further processing units. Let CSI(t)={CSI$_1$, . . . , CSI$_l$} denotes the CSI matrix of L streaming links, where each CSI$_l$={CSI$_{1,l}$, . . . , CSI$_{s,l}$} represents a complex number describing the signal received at subcarrier s∈ {1, 2, . . . , S} in stream l∈ {1, 2, . . . , L} at time t Considering that the matrix CSI$_{s,l}$ is formed from complex values, and magnitude and phase responses of subcarrier s of link l, respectively.

Figure 5:
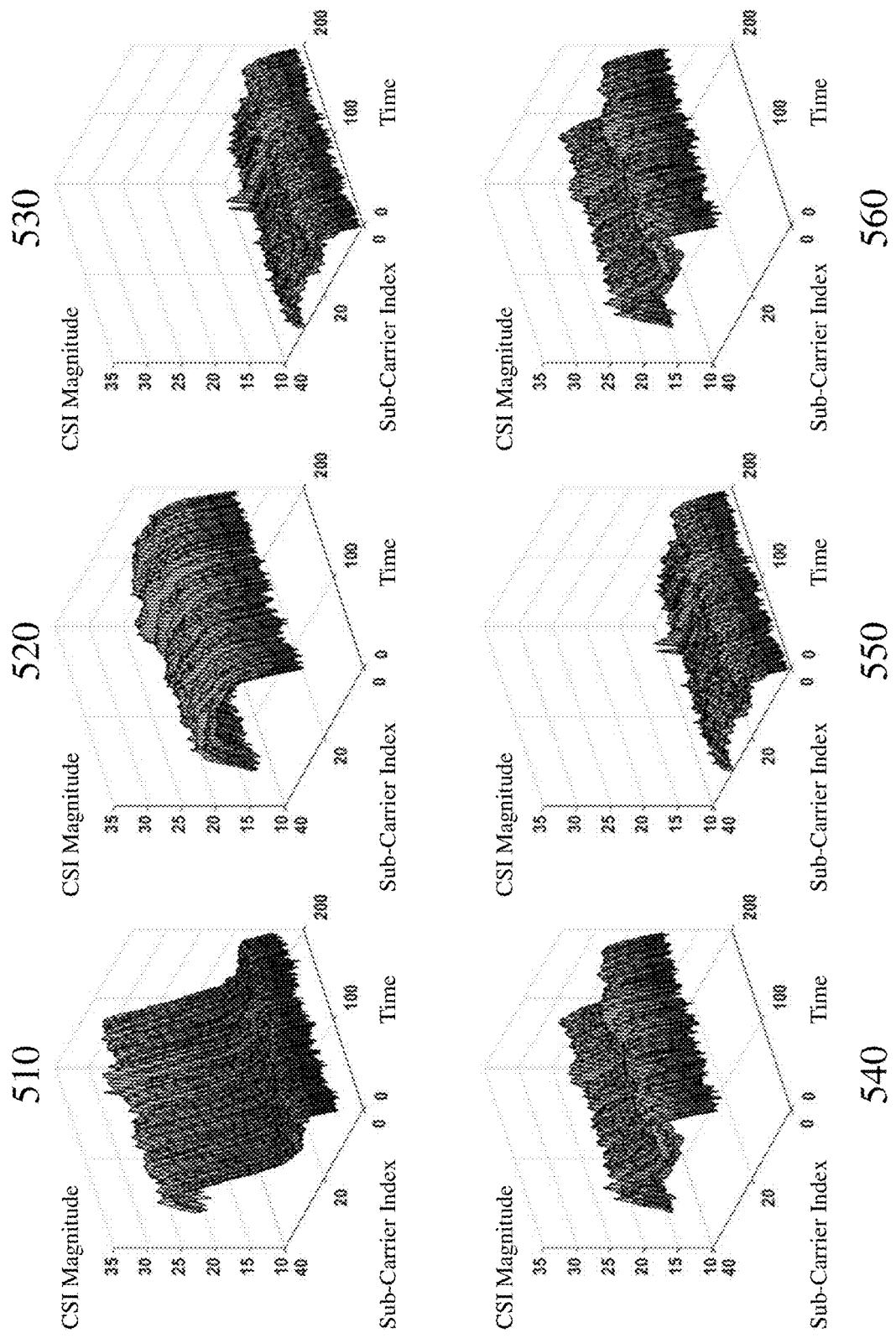
FIG. 5 depicts typical measurements of CSI signal magnitudes of all subcarriers and all data streams within an intelligent security system according to an embodiment of the invention.

Human motions and environmental changes affect the L stream independently, but they affect different S subcarriers of one stream in a similar manner. Referring to FIG. 5 there are depicted first to sixth graphs 510 to 560 respectively relating to typical measurements of CSI signal magnitudes, |CSI$_{s,l}$|, captured for S=30 subcarriers in L=6 streams within an intelligent security system according to an embodiment of the invention over a fixed time period. These plots exhibit CSI values of all streams in the same sensing area at the same time interval.

The feature generation step begins by sliding a moving window with length w to create a frame of consecutive temporal samples W=C(t−w), . . . , C(t−1), C(t), wherein we attempt to infer events. In addition to the magnitude and phase of CSI values and standard features such as moving minimum, maximum, average standard deviation, kurtosis and skewness, the following statistics are also calculated within an embodiment of the invention to correlate the CSI signal behavior to environmental changes.

The first feature is a moving variance of CSI matrix, which is a measure of how far the measurements are spread out during the time frame W, denoted by V$_l$={v$_{1,l}$, . . . , v$_{s,l}$} where each variance v$_{s,l}$ is individually computed for subcarrier s in stream l. In one embodiment of the invention, the average cumulative moving variance across all streams is calculated as given by Equation (2), which reflects the variation in the signal over time.

$$V = \frac{1}{L} * \sum_{l=1}^{L} V_l \tag{2}$$

$$E = \sum_{l=1}^{L} E_l \tag{3}$$

The next feature is the signal entropy of CSI matrix E$_l$={e$_{1,l}$, . . . , e$_{s,l}$}, which intuitively is a measure of unpredictability of information content and is individually calculated for subcarrier s in stream l during time frame W. In one implementation, the maximum cumulative entropy as given by Equation (3) is utilized as a measure of unexpected and/or strong changes in the observed signals.

Another simple but informative feature that can be extracted from CSI matrix is information regarding signal peaks and valleys including peak positions, counts, heights and widths. This information emphasizes the local minimum and maximum of the signals and seems correlated to the changes in the environment and, therefore, they can be used to distinguish the occurrence of different events in the environment. For example, the peak information extracted from CSI signals can be used in Pet Modeling unit 227, where physical movements of domestic animals are mathematically modeled to avoid confusion between pet and human movements within the sensing area.

The next feature is the histogram of the CSI matrix within the time frame W, which represents the distribution of amplitudes over pre-defined intervals. Intuitively, the histogram values of CSI measurements reflect the underlying characteristics of the changes or events within the captured frame W.

Figure 6:
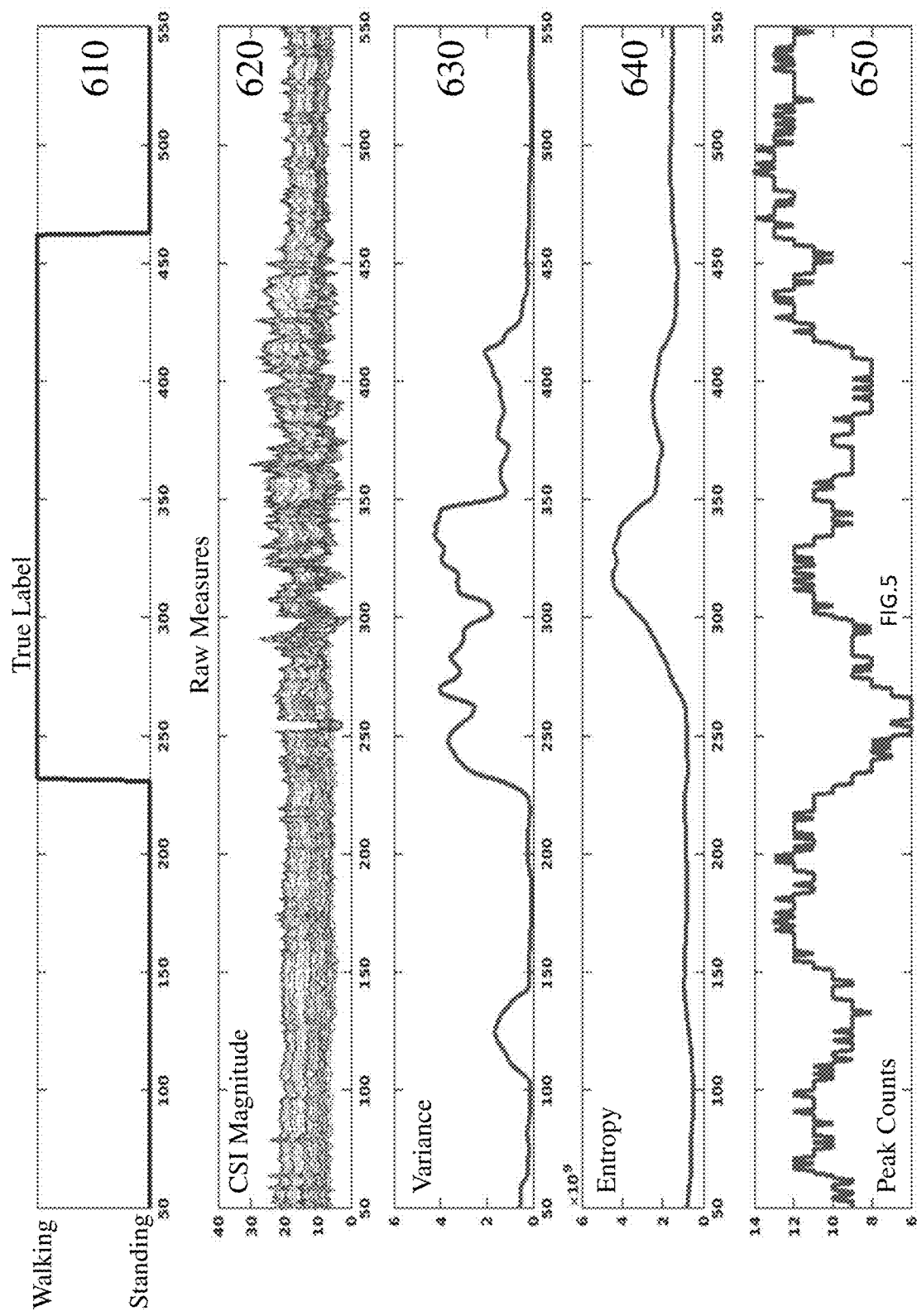
FIG. 6 depicts typical CSI magnitudes of all sub-carries from a single specific data stream and the extracted features using a moving window for standing and walking as measured and analysed by an intelligent security system according to an embodiment of the invention.

Now referring to FIG. 6 there are depicted first to fifth graphs 610 to 650 respectively with respect to the measurement, analysis, and result determination for an exemplary system according to an embodiment of the invention. Referring to second graph 620 there are depicted typical CSI magnitudes, $|CSI_{s,l}|$, of all sub-carriers from a single specific data stream and the extracted features using a moving window for a human subject "standing" and "walking" as measured and analysed by an intelligent security system according to an embodiment of the invention. Accordingly, within FIG. 6 the third to fifth graphs 630 to 650 respectively depict examples of the moving window analysis upon the sub-carrier CSI magnitudes, $|CSI_{s,l}|$, resulting determinations of variance, entropy, and peak counts. These are then employed in conjunction with others in embodiments of the invention in establishing whether the human subject is "walking" or "standing" within the measured zone yielding activity label assignments as depicted in first graph 610. The pre-processing unit 210 is followed by multiple specialized processing units that employ various data mining and knowledge discovery techniques such as classification, clustering and template matching to infer accurate and meaningful information about the changes within the sensing area. At each time frame, depending on the past and current status of the system, the decision making module decides what type of information is needed and then collects inquiries from the processing units to provide analytic results.

Within embodiments of the invention the Pre-Processing 210 may comprise a signal processing block that performs signals conditioning upon the wireless signals. Within an embodiment of the invention such a pre-processing block may include a bank of digital filters in a predetermined architecture for providing multiple signal paths of filtered signal that feed different detection blocks depending on the activities that the detection blocks are aimed to classify or distinguish.

Presence Detection 221: This unit provides a status indicator of the presence of humans or vehicles in the sensing area. The first step towards this process is to build a static "empty" profile of the sensing area from wireless measurements gathered within the covered area while no person or vehicle is inside. Staying in the "empty" profile for a certain, user specified, amount of time will trigger the Automatic Arming control 380 to arm the security system. When the system is armed, the "empty" profile is constantly checked against the current characteristics of the wireless measurements to detect whether any significant changes and/or movements occurred in the area. Once such variations are detected, the entrance detection unit queries the presence detection unit to either confirm or deny the occurrence of an "entrance" event, which either changes the status to "occupied" or maintains the "empty" status, respectively. On the other hand, this unit is responsible for capturing the moment at which everyone leaves the sensing area and has to set back the status to "empty" again. In one implementation, the empty static profile is built through computing and averaging the histogram features for several time frames of CSI values of the actual empty area. In this example, the security system constantly computes the same histogram-based features for real-time frames of CSI measurements, and then uses a template matching technique to quantify how these frames are similar to the "empty" profile. As an example, Kullback-Leblier (KL) Divergence, which is a measure of difference between two discrete probability distributions is used in order to discover abrupt variations from the "empty" profile.

It would be evident that the "empty" profile may be periodically updated and/or verified by establishing updates when the area surveilled is known to be empty.

Entrance Detection 220: This is one of the preliminary blocks of the proposed security system that detects any entrance to the sensing area, including both first entry to "empty" area and next entries to "occupied" area. The entrance detection algorithm is triggered when some variations in the sensing area is detected by the Presence Detection unit 221, at which point a classification technique is needed to confirm if this variation is caused by an actual human/vehicle entry. In one implementation, an entropy-based classifier is employed to determine if any entrance has occurred into the sensing area. In this example, a feature set is generated from the raw signals, including average mean values of the CSI matrix, moving variance, and entropy (due to its ability to capture the abrupt changes in the signals). The k-nearest neighbor classification technique is then applied to predict the action of entrance to the sensing area 400 although it would be evident that other classification techniques as known within the art may be applied.

User Identification 223: Once an entrance to the sensing area is confirmed, the next step is to identify the person who walked into the area from their specific gait pattern. Similarly, this block uses the measurements collected from wireless devices within the sensing area to identify the walking patterns. Since the action of walking is usually performed in a periodic fashion, the very first intuitive step of gait recognition is to detect the characteristics of the gait cycle and then construct a unique signature from this cycle. For example, in addition to the variance of CSI magnitudes of all data streams, a feature set including phase information, peak-counts and histogram information can be leveraged to build unique walking signatures.

The process of user identification consists of two different processes. First, it identifies whether the presence is a legal or authorized entry. This process begins by extracting the walking signatures of all authorized tenants of the property and then training a one-class classifier, which points out any abnormal pattern and identifies the stranger who walks into this location. An example of algorithm that can be used for identifying the abnormal walking pattern is one-class Support vector machines (SVM) commonly used for outlier detection problems although it would be evident that other techniques as known within the art may be applied.

Second, it activates another level of user identification only if the walking pattern belongs to an authorized user. In this case, an additional multi-class classification technique is applied to identify which owner has entered the property in order to initiate the user specified preferences of the smart home. Examples for classification algorithms that can efficiently classify different owners include multi-class SVM and Random Forests although it would be evident that other classification techniques as known within the art may be applied.

Location Identification 224: This processing unit uses the collected wireless measurements to track the location of the moving person as soon as some entrance to the covered area is detected. The motivation of using wireless signal communications for localization is that multiple paths between the transmitter and receiver react differently to the environmental disturbance. Moreover, the distance and/or angle of the source of disturbance with respect to the antennas contributes to these different variations. The idea is to use this location-dependent information to discover the position of the source of the disturbance (in this case human movements or activities). For example, the CSI magnitudes and phase information of all subcarriers in all streams can be used as features to identify different locations within the sensing area. Examples of the classification methods that can discover the location of movements and/or other physical activities within a sensing area from CSI measurements include Random Forests, SVM and k-nearest neighbor although it would be evident that other classification techniques as known within the art may be applied.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   providing a monitoring system comprising:
   a receiving circuit for receiving metrics from each wireless device of a plurality of wireless devices associated with a sensing region operating according to a common wireless standard where each wireless device of the plurality of wireless devices generates metrics in dependence upon wireless signals received by the wireless device of the plurality of devices from other wireless devices of the plurality of wireless devices;
   a processing block comprising a pre-processing system, a plurality of detection blocks and a decision making block comprising a plurality of decision making modules; wherein
   the pre-processing system comprises a bank of digital filters according to a predetermined architecture to perform signal conditioning upon the received metrics from the plurality of wireless devices to generate a plurality of signal paths of filtered signals;
   each detection block of the plurality of detection blocks receives a predetermined subset of the plurality of signal paths; and
   the predetermined subset is established in dependence upon an activity the detection block of the plurality of detections blocks establishes a classification for; wherein
   the monitoring system executes a sequence comprising:
   determining that an entry has been made into the sensing region;
   determining whether a legal entry into the sensing area has been made;
   upon a positive determination passing a subset of the plurality of signal paths to one or more home automation applications; and
   upon a negative determination passing a subset of the plurality of signal paths to one or more security applications;
   determination as to whether an entry has been made into the sensing area is established in dependence upon the processing block establishing with a template matching technique whether the sensing region is empty or not;
   the template matching technique employs a template for a static empty profile established from a histogram of the pre-processed received wireless signals; and
   the static empty profile of the sensed region from wireless measurements was established without a presence of a person or vehicle within the sensing region.

2. The method according to claim 1, wherein
the outputs from the plurality of detection blocks are only coupled to the decision making block when all outputs from the plurality of detection blocks are established.

3. The method according to claim 1, wherein
the processing block comprises a plurality of processing units; and
each processing unit executes a semantic and logical strategy relating to an action of a predetermined set of actions.

4. The method according to claim 1, wherein
the wireless devices forming the plurality of wireless devices varies with time as at least one of portable electronic devices and mobile electronic devices the wireless devices are associated with at least one of enter and leave the sensing region.

5. The method according to claim 1, wherein
the monitoring system also receives complimentary measurements which are independent of the wireless signals;
the pre-processing system applies one or more first signal processing techniques of a plurality of signal processing techniques to the received metrics where the one of more first signal processing techniques are established in dependence upon a type of the received metrics;
the pre-processing system applies one or more second signal processing techniques of the plurality of signal processing techniques to the complimentary measurements where the one of more second signal processing techniques are established in dependence upon a type of the complimentary measurements;
the pre-processing system applies one or more specialized processing units of a plurality of specialized processing units to the received metrics where the one or more specialized processing units are established in dependence upon the type of the received metrics; and the pre-processing system applies one or more other specialized processing units of the plurality of specialized processing units to the complimentary measurements where the one or more other specialized processing units are established in dependence upon the type of the complimentary measurements.

6. The method according to claim 1, wherein
the system operates upon a sequence of time frames;
at the end of each time frame the decision making block determines what information is needed and establishes enquiries to a subset of the plurality of decision making blocks to collect data from the subset of the plurality of decision making blocks; and
the determination of what information is needed is established in dependence upon a past status of the system in a previous time frame and current status of the system in the time frame just ended.

7. The method according to claim 1, wherein
the static empty profile and template are at least one of periodically updated and verified by establishing updates when the sensing region is determined to be empty.

8. A method comprising:
providing a monitoring system comprising:
   a receiving circuit for receiving metrics from each wireless device of a plurality of wireless devices associated with a sensing region operating according to a common wireless standard where each wireless device of the plurality of wireless devices generates metrics in dependence upon wireless signals received by the wireless device of the plurality of devices from other wireless devices of the plurality of wireless devices;
   a processing block comprising a pre-processing system, a plurality of detection blocks and a decision making block comprising a plurality of decision making modules; wherein
the pre-processing system comprises a bank of digital filters according to a predetermined architecture to perform signal conditioning upon the received metrics from the plurality of wireless devices to generate a plurality of signal paths of filtered signals;
each detection block of the plurality of detection blocks receives a predetermined subset of the plurality of signal paths; and
the predetermined subset is established in dependence upon an activity the detection block of the plurality of detections blocks establishes a classification for; wherein
the monitoring system executes a sequence comprising:
   determining that an entry has been made into the sensing region;
   establishing a monitoring phase of predetermined duration employing a predefined subset of the plurality of detection blocks and a subset of the plurality of decision making modules;
   determining with a subset of the plurality of processing blocks whether during the monitoring phase either that no anomaly within the sensing region was detected or that the entry relates to entry of a subject identified as being a safe or legal entry;
   upon a positive determination during the monitoring phase that either no anomaly within the sensing region was detected or that the entry relates to entry of a subject was identified as being a safe or legal entry terminating the monitoring period passing another subset of the plurality of signal paths to another subset of the plurality of decision making modules relating to one or more smart home applications; and
determination that the subject is identified as being safe or legal is established in dependence upon analysis of the perturbations within the wireless signals within the sensing area to identify the user based upon a walking pattern of the user and a body shape of the user.

9. A method comprising:
providing a monitoring system comprising:
   a receiving circuit for receiving metrics from each wireless device of a plurality of wireless devices associated with a sensing region operating according to a common wireless standard where each wireless device of the plurality of wireless devices generates metrics in dependence upon wireless signals received by the wireless device of the plurality of devices from other wireless devices of the plurality of wireless devices;
   a processing block comprising a pre-processing system, a plurality of detection blocks and a decision making block comprising a plurality of decision making modules; wherein
the pre-processing system comprises a bank of digital filters according to a predetermined architecture to perform signal conditioning upon the received metrics from the plurality of wireless devices to generate a plurality of signal paths of filtered signals;
each detection block of the plurality of detection blocks receives a predetermined subset of the plurality of signal paths; and
the predetermined subset is established in dependence upon an activity the detection block of the plurality of detections blocks establishes a classification for; wherein
the monitoring system executes a sequence comprising:
   determining that an entry has been made into the sensing region;
   establishing a monitoring phase of predetermined duration employing a predefined subset of the plurality of detection blocks and a subset of the plurality of decision making modules;
   determining with a subset of the plurality of processing blocks whether during the monitoring phase either that no anomaly within the sensing region was detected or that the entry relates to entry of a subject identified as being a safe or legal entry; and
   upon a positive determination during the monitoring phase that either no anomaly within the sensing region was detected or that the entry relates to entry of a subject was identified as being a safe or legal entry terminating the monitoring period passing another subset of the plurality of signal paths to another subset of the plurality of decision making modules relating to one or more smart home applications; and
determination that the subject is identified as being safe or legal is established in dependence upon analysis of the perturbations within the wireless signals within the sensing area with respect to pre-defined user profiles established for subjects identified as being safe or legal.

10. A method comprising:
providing a monitoring system comprising:
   a receiving circuit for receiving metrics from each wireless device of a plurality of wireless devices associated with a sensing region operating according to a common wireless standard where each wireless device of the plurality of wireless devices generates metrics in dependence upon wireless signals received by the wireless device of the plurality of devices from other wireless devices of the plurality of wireless devices;

a processing block comprising a pre-processing system, a plurality of detection blocks and a decision making block comprising a plurality of decision making modules; wherein the pre-processing system comprises a bank of digital filters according to a predetermined architecture to perform signal conditioning upon the received metrics from the plurality of wireless devices to generate a plurality of signal paths of filtered signals;

each detection block of the plurality of detection blocks receives a predetermined subset of the plurality of signal paths; and the predetermined subset is established in dependence upon an activity the detection block of the plurality of detections blocks establishes a classification for; wherein the monitoring system executes a sequence comprising:
 determining that an entry has been made into the sensing region;
 establishing a monitoring phase of predetermined duration employing a predefined subset of the plurality of detection blocks and a subset of the plurality of decision making modules;
 determining with a subset of the plurality of processing blocks whether during the monitoring phase either that no anomaly within the sensing region was detected or that the entry relates to entry of a subject identified as being a safe or legal entry; and
 upon a positive determination during the monitoring phase that either no anomaly within the sensing region was detected or that the entry relates to entry of a subject was identified as being a safe or legal entry terminating the monitoring period passing another subset of the plurality of signal paths to another subset of the plurality of decision making modules relating to one or more smart home applications;

determination that the subject is identified as being safe or legal is established in dependence upon analysis of the perturbations within the wireless signals within the sensing area to identify the user based upon a walking pattern of the user; and where the entry into the area is made with a vehicle user identification is enabled to detect the identity of the subject through gait recognition as soon as the subject exists the vehicle and begins walking.

\* \* \* \* \*